United States Patent
Xu (10) Patent No.: US 9,420,525 B2
(45) Date of Patent: Aug. 16, 2016

(54) CELL SEARCH METHOD AND DEVICE

(71) Applicant: MStar Semiconductor, Inc., Hsinchu Hsien (TW)

(72) Inventor: Hu-Jian Xu, Shanghai (CN)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/722,240

(22) Filed: May 27, 2015

(65) Prior Publication Data
US 2015/0351016 A1 Dec. 3, 2015

(30) Foreign Application Priority Data
May 28, 2014 (CN) .......................... 2014 1 0231393

(51) Int. Cl.
*H04W 56/00* (2009.01)
*H04W 48/16* (2009.01)

(52) U.S. Cl.
CPC .............. *H04W 48/16* (2013.01); *H04W 56/00* (2013.01)

(58) Field of Classification Search
CPC ... H04W 48/16; H04W 56/00; H04W 56/001; H04W 48/08; H04W 56/0005; H04W 56/0085; H04W 48/04; H04W 56/0035; H04J 11/0069; H04J 11/0093; H04J 13/00; H04J 3/06
USPC ..................... 455/434, 435.1, 435.2
See application file for complete search history.

(56) References Cited

U.S. PATENT DOCUMENTS

2016/0143062 A1 * 5/2016 Popovic .............. H04L 27/2655
370/329

* cited by examiner

*Primary Examiner* — Inder Mehra
(74) *Attorney, Agent, or Firm* — WPAT, PC; Justin King (57) ABSTRACT

A cell search method is applied to a wireless system for cell search synchronization. Frame signals of the wireless system include a first sub-frame and a second sub-frame. Both of the first and second sub-frames include a first regular timeslot and a down pilot timeslot. It is determined whether a length of an actual synchronization window is smaller than a length of the first synchronization search window that is a sum of a length of the first-sub frame and a length the first regular timeslot and the down pilot of the second sub-frame. When the length of the actual synchronization search window is smaller, at least a part of data carried in the first regular timeslot and the down pilot timeslot of the second sub-frame or the first sub-frame is duplicated to before or after the actual synchronization search window.

12 Claims, 4 Drawing Sheets

CELL SEARCH METHOD AND DEVICE

This application claims the benefit of People's Republic of China application Serial No. 201410231393.7, filed May 28, 2014, the subject matter of which is incorporated herein by reference.

BACKGROUND OF THE INVENTION

1. Field of the Invention

The invention relates in general to the field of communication technologies, and more particularly to a cell search method and device.

2. Description of the Related Art

The time division-synchronous code division multiple access (TD-SCDMA) system defines that one sub-frame has a total length of 6400 chips and a period of 5 ms. Each sub-frame is divided into 7 regular timeslots ($T_s$) and 3 special timeslots. The 7 regular timeslots are $T_s0 \sim T_s6$, each having a length of 96 chips and a period of 675 µs. The 3 special timeslots include a Down Pilot Timeslot (DwPTS) having a length of 96 chips and a period of 75 µs, a Guard Period (GP) having a length of 96 chips and a period of 75 µs, and an Up Pilot Timeslot (UpPTS) having a length of 160 chips and a period of 125 µs.

The timeslot $T_s0$ and the 3 following down pilot timeslots DwPTS are used for TD-SCDMA system cell search synchronization. More specifically, the timeslot $T_s0$ serves for down timeslots to transmit system broadcasting information, and DwPTS is used for down pilot and down synchronization.

Figure 1:
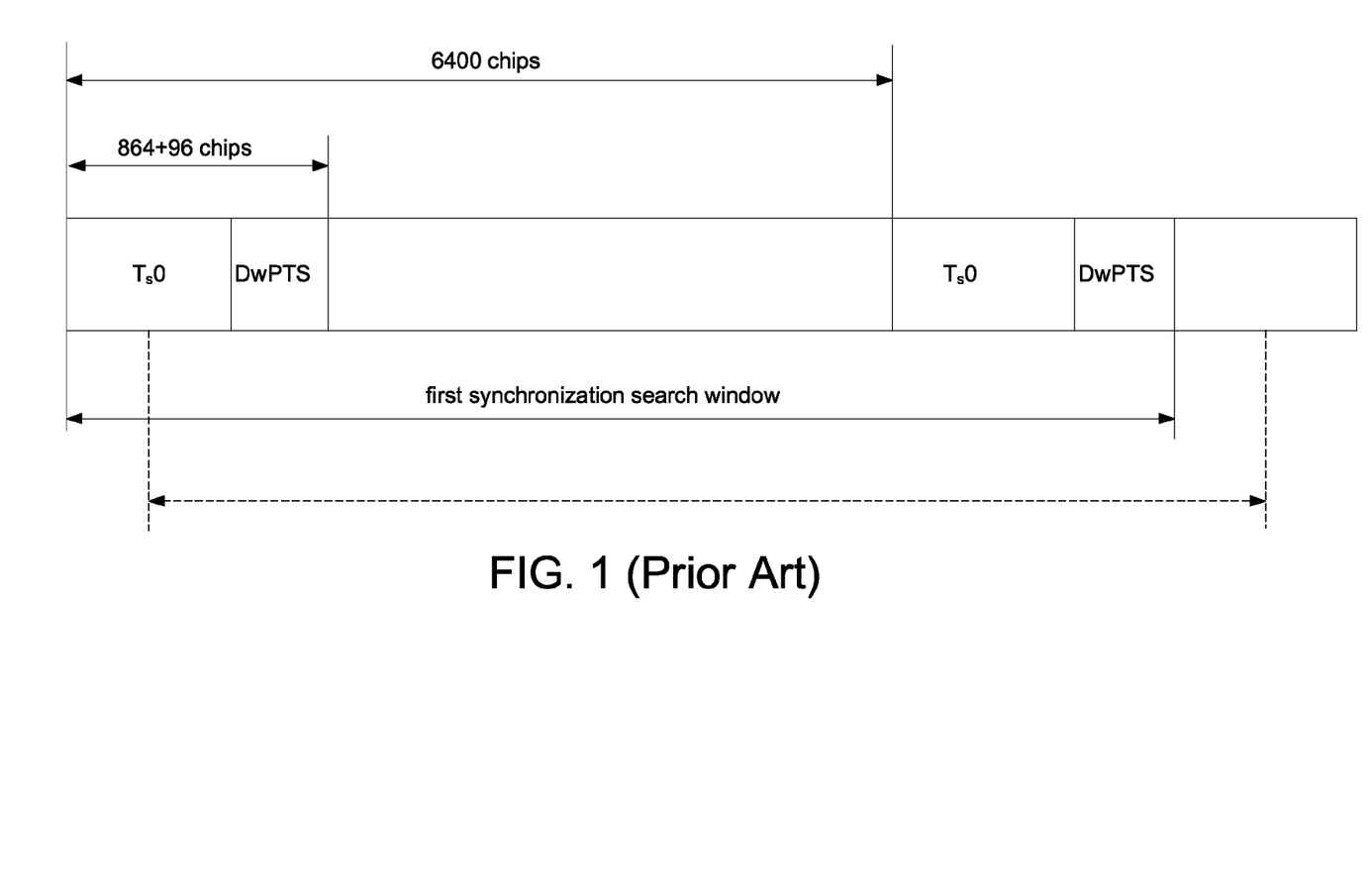
FIG. 1 is a schematic diagram of a TD-SCDMA cell synchronization search window of the prior art.

In the TD-SCDMA cell search, in a synchronization process, $T_s0$ and DwPTS are detected, and cell search synchronization information therein is retrieved for the synchronization. FIG. 1 shows a schematic diagram of a TD-SCDMA cell synchronization window in the prior art. In the prior art, a first synchronization window is disposed to ensure that the search window at least includes two consecutive $T_s0$ and DwPTS. Thus, it is ensured that one complete set of and consecutive $T_s0$ and DwPTS can be found from any search starting point, so as to satisfy a common algorithm in order to perform a next synchronization process. Therefore, the first synchronization search window at least has a length of a sum of the length of one sub-frame, the length of $T_s0$ and the length of DwPTS (6400+864+96=7360 chips), and a period of 5.75 ms.

However, under certain circumstances, it cannot be ensured that the length of an actual synchronization window satisfies the minimum length of the first synchronization search window, resulting in a cell search synchronization failure. For example, when a TD-SCDMA/GMS dual-mode terminal is in a GSM PTM mode, the length reserved for a TD-SCDMA actual search window may be as short as 9 GSM timeslots (5.19 ms), which further includes the conversion and stabilization time reserved for GSM/TD-SCDMA RF components. In the above situation, it cannot be ensured that the actual synchronization search window meets the minimum length of 5.75 ms, meaning that the search window may not contain successive $T_s0$ and DwPTS. As a result, the failure rate of TD-SCDMA cell search synchronization is significantly increased to degrade the transmission quality.

SUMMARY OF THE INVENTION

The application is directed to a cell search method and device capable of filling duplicated cell search synchronization information to before or after an actual synchronization search window according to a length of the actual synchronization search window. Thus, a minimum length of a synchronization search window required by current algorithms can be satisfied to perform synchronization information search and to further increase a rate of successful cell search synchronization.

The application provides a cell search method applied to a wireless communication system for cell search synchronization. Frame signals of the wireless communication system include a first sub-frame and a second sub-frame, both of the first sub-frame and the second sub-frame include a first regular timeslot and a down pilot timeslot. The cell search method includes steps of: determining whether a length of an actual synchronization search window is smaller than a length of a first synchronization search window, wherein the length of the first synchronization search window is a sum of a length of the first sub-frame and a length of the first regular timeslot and the down pilot timeslot of the second sub-frame; and when the length of the actual synchronization search window is smaller than the length of the first synchronization search window, duplicating at least a part of data carried in the first regular timeslot and the down pilot timeslot of the second sub-frame to before the actual synchronization search window, or duplicating at least a part of data carried in the first regular timeslot and the down pilot timeslot of the first sub-frame to after the actual synchronization search window, such that a sum of a length of the duplicated data and the length of the actual synchronization search window is not smaller than the length of the first synchronization search window.

The application provides a cell search device applied to wireless communication system for cell search synchronization. Frame signals of the wireless communication system include a first sub-frame and a second sub-frame, both of, the first sub-frame and the second sub-frame include a first regular timeslot and a down pilot timeslot. The cell search device includes a determination module and a control module. The determination module determines whether a length of an actual synchronization search window is smaller than a length of a first synchronization search window, wherein the length of the first synchronization search window is a sum of a length of the first sub-frame and a length of the first regular timeslot and the down pilot timeslot of the second sub-frame, and sends a determination result to the control module. When the length of the actual synchronization search window is smaller than the length of the first synchronization search window, the control module duplicates at least a part of data carried in the first regular timeslot and the down pilot timeslot of the second sub-frame to before the actual synchronization search window, or duplicates at least a part of data carried in the first regular timeslot and the down pilot timeslot of the first sub-frame to after the actual synchronization search window, such that a sum of a length of the duplicated data and the length of the actual synchronization search window is not smaller than the length of the first synchronization search window.

The above and other aspects of the invention will become better understood with regard to the following detailed description of the preferred but non-limiting embodiments. The following description is made with reference to the accompanying drawings.

DETAILED DESCRIPTION OF THE INVENTION

Details of embodiments are given with the accompanying drawings below.

Figure 3:
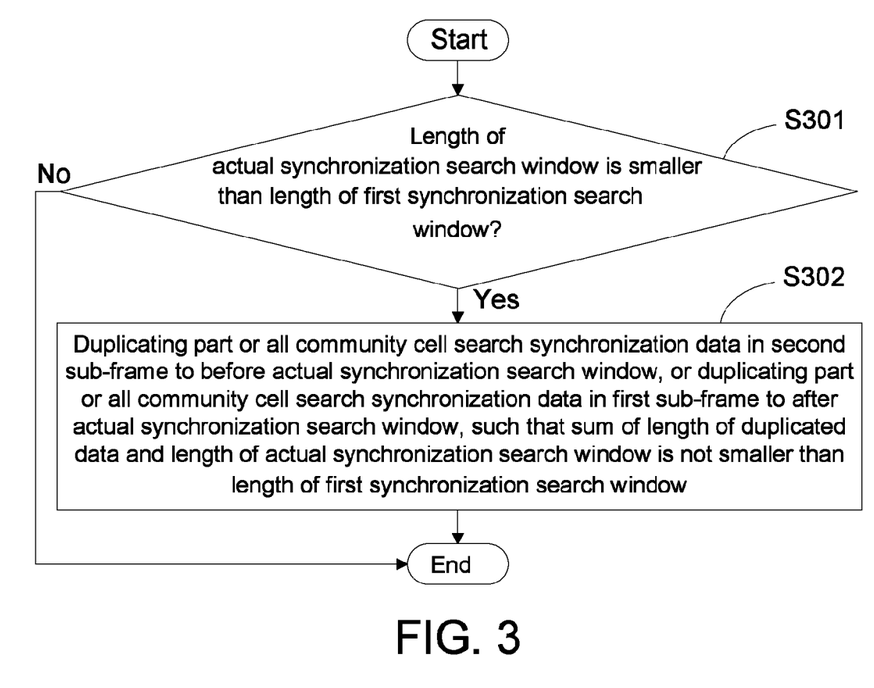
FIG. 3 is a flowchart of a cell search method according to an embodiment of the application.

FIG. 3 shows a flowchart of a cell search method according to an embodiment of the application. In the embodiment, one type of synchronization search window in a TD-SCDMA cell is given as an example and is not to be construed as a limitation to the application.

Figure 2:
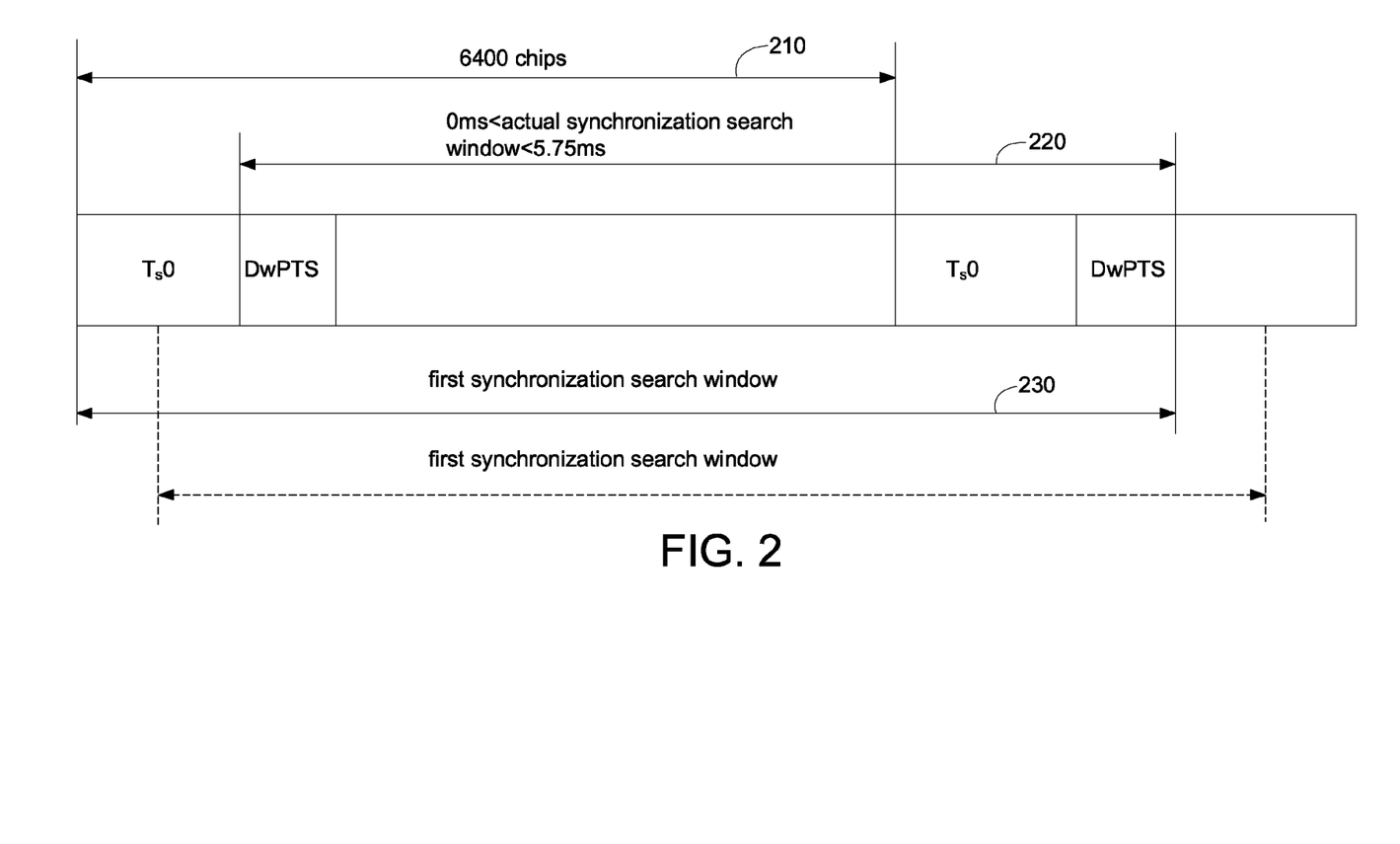
FIG. 2 is a schematic diagram of a synchronization search window according to an embodiment of the application.

FIG. 2 shows a schematic diagram of a synchronization search window according to an embodiment of the application. In the embodiment, one type of synchronization search window in a TD-SCDMA cell is given as an example and is not to be construed as a limitation to the application. The synchronization search window includes a first sub-frame 210, an actual synchronization search window 220, and a first synchronization search window 230.

In the embodiment, the cell search method includes following steps.

In step S301, it is determined whether a length of the actual synchronization search window is smaller than a length of a first synchronization search window. The length of the first synchronization search window is equal to a sum of a length of a first sub-frame and a length of a first regular timeslot 0 and a down pilot timeslot of a second sub-frame. The process ends when a determination result of step S301 is negative.

Without changing a current search algorithm, in order to realize TD-SCDMA system cell search synchronization for a mobile terminal, it needs to be ensured that data carried in a timeslot 0 and a down pilot timeslot of at least one first sub-frame or a second sub-frame is consecutive and complete. Thus, the integrity of synchronization information is ascertained to guarantee successful synchronization between the mobile terminal and the cell.

Before performing TD-SCDMA cell search synchronization between a mobile terminal and a cell, the mobile terminal receives data and determines whether the length of the actual synchronization search window 220 is smaller than the length of the first synchronization search window 230. The length of the actual synchronization search window 230 is a sum of the length of the first sub-frame 210 and the length of the timeslot 0 and the down pilot timeslot of the second sub-frame. In the embodiment, according to current common search algorithms, the first synchronization search window 230 is required to have a length of at least 5.75 ms. In another embodiment, the first synchronization search window 230 may have a length smaller than 5.75 ms.

In step S302, when the length of the actual synchronization search window is smaller than the length of the first synchronization search window, a part or all of the cell search synchronization data in the second sub-frame is duplicated to before the actual synchronization search window, or a part or all of the cell search synchronization data in the first sub-frame is duplicated to after the actual synchronization search window, such that a sum of the length of the duplicated data and the length of the actual synchronization search window is not smaller than the length of the first synchronization search window. Thus, it is ensured that the data carried in the timeslot 0 and the down pilot timeslot of at least one first sub-frame or the second sub-frame is consecutive and complete. The cell search synchronization data includes the data carried in the timeslot 0 and the down pilot timeslot.

When the mobile terminal determines that the length of the actual synchronization search window 220 is smaller than the length of the first synchronization search window 230, the mobile terminal duplicates a part or all of the cell search synchronization data in the second sub-frame to before the actual synchronization search window 220, or duplicates a part or all of the cell search synchronization data in the first sub-frame to after the actual synchronization search window 220, such that a sum of a length of the duplicated data and the length of the actual synchronization search window 220 is greater than or equal to the length of the first synchronization search window 230. Thus, it is ensured that the data carried in the timeslot 0 and the down pilot timeslot of at least one first sub-frame or the second sub-frame is successive and complete, so as to allow the mobile terminal and the cell to perform TD-SCDMA cell search synchronization. The cell search synchronization data includes the data carried in the timeslot 0 and the down pilot timeslot.

Figure 4:
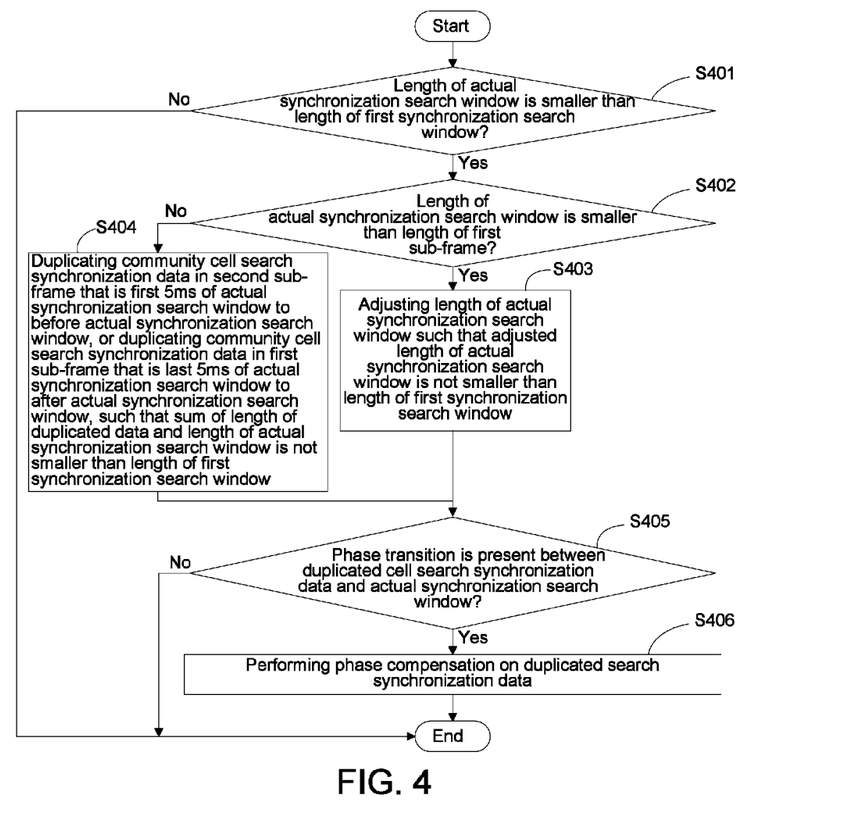
FIG. 4 is a flowchart of a cell search method according to another embodiment of the application.

FIG. 4 shows a flowchart of a cell search method according to an embodiment of the application. In the embodiment, a TD-SCDMA cell search is given an example and is not to be construed as a limitation to the application.

Also referring to FIG. 2, in the embodiment, the cell search method includes following steps.

In step S401, it is determined whether a length of an actual synchronization search window is smaller than a length of a first synchronization search window. The length of the first synchronization search window is equal to a sum of a length of a first sub-frame and a length of a timeslot 0 and a down pilot timeslot of a second sub-frame. The process ends when a determination result of step S401 is negative.

Without changing a current search algorithm, in order to realize TD-SCDMA system cell search synchronization for a mobile terminal, it needs to be ensured that data carried in a timeslot 0 and a down pilot timeslot of at least one first sub-frame or a second sub-frame is consecutive and complete. Thus, the integrity of synchronization information is ascertained to guarantee successful synchronization between the mobile terminal and the cell.

Before performing TD-SCDMA cell search synchronization between a mobile terminal and a cell, the mobile terminal receives data and determines whether the length of the actual synchronization search window 220 is smaller than the length of the first synchronization search window 230. The length of the actual synchronization search window is a sum of the length of the first sub-frame 210 and the length of the timeslot 0 and the down pilot timeslot of the second sub-frame. In the embodiment, according to current common search algorithms, the first synchronization search window 230 is required to have a length of at least 5.75 ms. In another embodiment, the first synchronization search window 230 may have a length smaller than 5.75 ms.

In step S402, when the length of the actual synchronization search window is smaller than the length of the first synchronization search window, it is further determined whether the length of the actual synchronization search window is smaller than the length of the first sub-frame.

When a determination result of step S402 is affirmative, in step S403, the length of the actual synchronization search window is adjusted, such that the adjusted length of the actual synchronization search window is not smaller than the length of the first synchronization search window, thereby ensuring that data carried in the timeslot 0 and the down pilot timeslot of at least one first sub-frame or the second sub-frame is successive and complete. The cell search synchronization data includes the data carried in the timeslot 0 and the down pilot timeslot.

When the mobile terminal determines that the length of the actual synchronization search window 220 is smaller than the length of the first synchronization search window 230, the mobile terminal further determines whether the length of the actual synchronization search window 220 is smaller than the length of the first sub-frame 210, and adjusts the length of the actual synchronization search window 220 according to the determination result, such that the adjusted length of the actual synchronization search window 220 is not smaller than the length of the first synchronization search window 230, thereby ensuring that data carried in the timeslot 0 and the down pilot timeslot of at least one first sub-frame or the second sub-frame is successive and complete. The cell search synchronization data includes the data carried in the timeslot 0 and the down pilot timeslot.

When the mobile terminal determines that the length of the actual synchronization search window 220 is not smaller than the length of the first sub-frame 210, the mobile terminal duplicates the cell search synchronization data in the second sub-frame that is the first 5 ms of the actual synchronization search window to before the actual synchronization search window, or duplicates the cell search synchronization data in the first sub-frame that is the last 5 ms of the actual synchronization search window 220 to after the actual synchronization search window 220, such that a sum of the length of the duplicated data and the length of the actual synchronization search window 220 is not smaller than the length of the first synchronization search window 230, thereby ensuring that data carried in the timeslot 0 and the down pilot timeslot of at least one first sub-frame or the second sub-frame is successive and complete.

Selectively, when the mobile terminal determines that the length of the actual synchronization search window 220 is smaller than the length of the first sub-frame 210, predetermined data is filled to before the actual synchronization search window 220, or the predetermined data is filled to after the actual synchronization search window 220, such that a sum of the length of the filled predetermined data and the length of the actual synchronization search window 220 is equal to the length of the first synchronization search window 230, thereby ensuring that data carried in the timeslot 0 and the down pilot timeslot of at least one first sub-frame or the second sub-frame is successive and complete. The predetermined data is 0 or random numbers.

When the predetermined data is filled to before the actual synchronization search window 220, the mobile terminal duplicates the cell search synchronization data of the actual synchronization search window 220 to before of the filled predetermined data, such that a sum of the length of the duplicated data and the filled predetermined data and the length of the actual synchronization search window 220 is not smaller than the length of the first synchronization search window 230.

When the predetermined data is filled to after the actual synchronization search window 220, the mobile terminal duplicates the cell search synchronization data of the actual synchronization search window 220 to after the filled predetermined data, such that the sum of the length of the duplicated data and the filled predetermined data and the length of the actual synchronization search window 220 is not smaller than the length of the first synchronization search window 230.

In step S405, it is further determined whether phase transition is present between the duplicated cell search synchronization data and the actual synchronization search window. When the phase transition is present, phase compensation is performed on the duplicated cell search synchronization data, as step S406. The process ends when a determination result of step S405 is negative.

The mobile terminal further determines whether phase transition is present between the duplicated search synchronization data and the actual synchronization search window 220. When the phase transition is present, phase compensation is performed on the duplicated cell search synchronization data, such that the phases of the duplicated cell search synchronization data and the actual synchronization search window 220 are kept consistent, thereby allowing the mobile terminal and the cell to perform TD-SCDMA cell search synchronization. When the phase transition is not present, the mobile terminal does not need to perform phase compensation on the duplicated cell search synchronization data, and directly performs TD-SCDMA cell search synchronization with the cell. For example, when one set of 5 ms sub-frame data is received in time division duplexing (TDD), if the receiving system contains a 100 Hz frequency shift, 180-degree transition then exists between the first sub-frame data and the second sub-frame data received. That is, 180-degree transition is present between the duplicated cell search synchronization data and the actual synchronization search window 220. In the embodiment, the phase compensation method is not limited.

Figure 5:
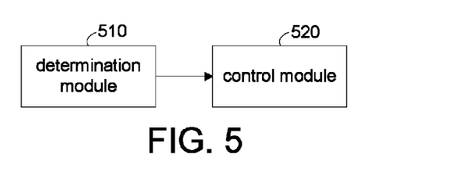
FIG. 5 is a schematic diagram of a cell search device according to an embodiment of the application.

FIG. 5 shows a schematic diagram of a cell search device according to an embodiment of the application. In the embodiment, a TD-SCDMA cell search is given an example and is not to be construed as a limitation to the application.

Also referring to FIG. 2, in the embodiment, the cell search device includes a determination module 510 and a control module 520.

Without changing a current search algorithm, in order to realize TD-SCDMA system cell search synchronization for a mobile terminal, it needs to be ensured that data carried in a timeslot 0 and a down pilot timeslot of at least one first sub-frame or a second sub-frame is consecutive and complete. Thus, the integrity of synchronization information is ascertained to guarantee successful synchronization between the mobile terminal and the cell.

The determination module 510 determines whether a length of the actual synchronization search window is smaller than a length of a synchronization search window. The length of the first synchronization search window is equal to a sum of a length of a first sub-frame and a length of a first regular time slot 0 and a down pilot timeslot of a second sub-frame. For example, before the mobile terminal and the cell performs TD-SCDMA cell search synchronization, the determination module 510 receives data and determines whether the length of the actual synchronization search window 220 is smaller than the length of the first synchronization search window 230. The length of the first synchronization search window 230 is equal to a sum of a length of a first sub-frame and a length of a timeslot 0 and a down pilot timeslot of a second sub-frame. In the embodiment, according to current common search algorithms, the first synchronization search window 230 is required to have a length of at least 5.75 ms. In another embodiment, the first synchronization search window 230 may have a length smaller than 5.75 ms.

The determination module 510 sends the determination result to the control module 520.

The control module 520 receives the determination result. When the length of the actual synchronization search window is smaller than the length of the first synchronization search window, the control module 520 further duplicates a part or all of the cell search synchronization data in the second sub-frame to before the actual synchronization search window, or duplicates a part or all of the cell search synchronization data in the first sub-frame to after the actual synchronization search window, such that a sum of the length of the duplicated data and the length of the actual synchronization search window is not smaller than the length of the first synchronization search window 230. Thus, it is ensured that the data carried in the timeslot 0 and the down pilot timeslot of the at least one first sub-frame or the second sub-frame is consecutive and complete. The cell search synchronization data includes the data carried in the timeslot 0 and the down pilot timeslot.

For example, when the determination module 510 determines that the length of the actual synchronization search window is smaller than the length of the first synchronization search window 230, the control module 520 duplicates a part or all of the cell search synchronization data in the second sub-frame to before the actual synchronization search window 220, or duplicates a part or all of the cell search synchronization data in the first sub-frame to after the actual synchronization search window 220, such that the sum of the length of the duplicated data and the length of the actual synchronization search window 220 is greater than or equal to the length of the first synchronization search window 230. Thus, it is ensured that the data carried in the timeslot 0 and the down pilot timeslot of at least one first sub-frame or the second sub-frame is successive and complete, so as to allow the mobile terminal and the cell to perform TD-SCDMA cell search synchronization. The cell search synchronization data includes the data carried in the timeslot 0 and the down pilot timeslot.

Selectively, when the length of the actual synchronization search window is smaller than the length of the first synchronization search window, the determination module 510 further determines whether the length of the actual synchronization search window is smaller than the length of the first sub-frame. For example, when the determination module 510 determines that the length of the actual synchronization search window 220 is smaller than the length of the first synchronization search window 230, the determination module 510 further determines whether the length of the actual synchronization search window 220 is smaller than the length of the first sub-frame 210.

Selectively, when the length of the actual synchronization search window is not smaller than the length of the first sub-frame, the control module 520 further duplicates the cell search synchronization data in the second sub-frame that is the first 5 ms of the actual synchronization search window to before the actual synchronization search window, or duplicates the cell search synchronization data in the first sub-frame that is the last 5 ms of the actual synchronization search window to after the actual synchronization search window, such that a sum of a length of the duplicated data and the length of the actual synchronization search window is not smaller than the length of the first synchronization search window, thereby ensuring that data carried in the timeslot 0 and the down pilot timeslot of at least one first sub-frame or the second sub-frame is successive and complete. The cell search synchronization data includes the data carried in the timeslot 0 and the down pilot timeslot.

For example, when the determination module 510 determines that the length of the actual synchronization search window 220 is not smaller than the length of the first sub-frame 210, the control module 520 duplicates the cell search synchronization data in the second sub-frame that is the first 5 ms of the actual synchronization search window 220 to before the actual synchronization search window 220, or duplicates the cell search synchronization data in the first sub-frame that is the last 5 ms of the actual synchronization search window to after the actual synchronization search window, such that a sum of the length of the duplicated data and the length of the actual synchronization search window 220 is not smaller than the length of the first synchronization search window 230, thereby ensuring that data carried in the timeslot 0 and the down pilot timeslot of at least one first sub-frame or the second sub-frame is successive and complete. The cell search synchronization data includes the data carried in the timeslot 0 and the down pilot timeslot.

Selectively, when the length of the actual synchronization search window 220 is smaller than the length of the first sub-frame 210, the control module 520 fills predetermined data to before the actual synchronization search window 220, or fills the predetermined data to after the actual synchronization search window 220, such that a sum of the length of the filled predetermined data and the length of the actual synchronization search window 220 is equal to the length of the first synchronization search window 230, thereby ensuring that the data carried in the timeslot 0 and the down pilot timeslot of at least one first sub-frame or the second sub-frame is consecutive and complete.

For example, when the determination module 510 determines that the length of the actual synchronization search window 220 is smaller than the length of the first sub-frame, the control module 520 further fills predetermined data to before the actual synchronization search window 220, or fills the predetermined data to after the actual synchronization search window 220, such that a sum of the length of the filled predetermined data and the length of the actual synchronization search window 220 is equal to the length of the first synchronization search window 230, thereby ensuring that the data carried in the timeslot 0 and the down pilot timeslot of at least one first sub-frame or the second sub-frame is consecutive and complete. The predetermined data is 0 or random numbers.

When the predetermined data is filled to before the actual synchronization search window, the control module 520 duplicates the cell search synchronization data of the actual synchronization search window 220 to before the filled predetermined data, such that a sum of the length of the duplicated data and the filled predetermined data and the length of the actual synchronization search window 220 is not smaller than the length of the first synchronization search window 230, thereby ensuring that the data carried in the timeslot 0 and the down pilot timeslot of at least one first sub-frame or the second sub-frame is consecutive and complete.

When the predetermined data is filled to after the actual synchronization search window 220, the control module 520 duplicates the cell search synchronization data of the actual synchronization search window 220 to after the filled predetermined data, such that the sum of the length of the duplicated data and the filled predetermined data and the length of the actual synchronization search window 220 is not smaller than the length of the first synchronization search window 230, thereby ensuring that the data carried in the timeslot 0 and the down pilot timeslot of at least one first sub-frame or the second sub-frame is consecutive and complete.

Selectively, the determination module 520 further determines whether phase transition is present between the duplicated cell search synchronization data and the actual synchronization search window. When a determination result of the determination module 510 indicates that the phase transition is present, the control module 520 performs phase compensation on the duplicated cell search synchronization data, such that the phases of the duplicated cell search synchronization data and the actual synchronization search window 220 are kept consistent, thereby allowing the mobile terminal and the cell to perform TD-SCDMA cell search synchronization. When the phase transition is not present, the mobile terminal does not need to perform phase compensation on the duplicated cell search synchronization data, and directly performs TD-SCDMA cell search synchronization with the cell. For example, when one set of 5 ms sub-frame data is received in time division duplexing (TDD), if the receiving system contains a 100 Hz frequency shift, 180-degree transition then exists between the first sub-frame data and the second sub-frame data received. That is, 180-degree transition is present between the duplicated cell search synchronization data and the actual synchronization search window 220. In the embodiment, the phase compensation method is not limited.

In conclusion, in the application, using the repetition property in the structure of TD-SCDMA frames, it is determined whether the length of the actual synchronization search window 220 is smaller than the length of the first synchronization search window 230. When the length of the actual synchronization search window is 220 is smaller than the length of the first synchronization search window 230, a part or all of the cell search synchronization data in the second sub-frame is duplicated to before the actual synchronization search window, or a part or all of the cell search synchronization data in the first sub-frame is duplicated to after the actual synchronization search window, such that the sum of the length of the duplicated data and the length of the actual synchronization search window is not smaller than the length of the first synchronization search window 230, thereby ensuring that the data carried in the timeslot 0 and the down pilot timeslot of at least one first sub-frame or the second sub-frame is consecutive and complete. The cell search synchronization data includes data carried in the timeslot 0 and the down pilot timeslot. Thus, the minimum length of a synchronization search window required by current search algorithms is satisfied to perform synchronization information search and to further increase the rate of successful cell search synchronization.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cell search method, applied to a wireless communication system to perform cell search synchronization, frame signals of the wireless communication system comprising a first sub-frame and a second sub-frame, both of the first sub-frame and the second sub-frame comprising a first regular timeslot and a down pilot timeslot; the cell search method comprising:

determining whether a length of an actual synchronization search window is smaller than a length of a first synchronization search window, wherein the length of the first synchronization search window is a sum of a length of the first sub-frame and a length of the first regular timeslot and the down pilot timeslot of the second sub-frame; and when the length of the actual synchronization search window is smaller than the length of the first synchronization search window, duplicating a part of data carried in the first regular timeslot and the down pilot timeslot of the second sub-frame to before the actual synchronization search window, or duplicating a part of data carried in the first regular timeslot and the down pilot timeslot of the first sub-frame to after the actual synchronization search window, such that a sum of a length of the duplicated data and the length of the actual synchronization search window is not smaller than the length of the first synchronization search window.

2. The cell search method according to claim 1, wherein the length of the first synchronization search window is at least 5.75 ms.

3. The cell search method according to claim 1, after the step of determining whether the length of the actual synchronization search window is smaller than the length of the first synchronization search window, further comprising:

when the length of the actual synchronization search window is smaller than the length of the first synchronization search window, further determining whether the length of the actual synchronization search window is smaller than the length of the first sub-frame; and when the length of the actual synchronization search window is not smaller than the length of the first sub-frame, duplicating cell search synchronization data in the second sub-frame that is the first 5 ms of the actual synchronization search window to before the actual synchronization search window, or duplicating cell search synchronization data in the first sub-frame that is the last 5 ms of the actual synchronization search window to after the actual synchronization search window, such that a sum of the length of the duplicated data and the length of the actual synchronization search window is not smaller than the length of the first synchronization search window;

wherein, the cell search synchronization data in the second sub-frame comprises the data carried in the first regular timeslot and the down pilot timeslot of the second sub-frame, and the cell search synchronization data in the first sub-frame comprises the data carried in the regular timeslot and the down pilot timeslot of the first sub-frame.

4. The cell search method according to claim 3, after the step of determining whether the length of the actual synchronization search window is smaller than the length of the first sub-frame, further comprising:

when the length of the actual synchronization search window is smaller than the length of the first synchronization search window, filling predetermined data to before the actual synchronization search window, or filling the predetermined data to after the actual synchronization search window, such that a sum of a length of the filled predetermined data and the length of the actual synchronization search window is equal to the length of the first synchronization search window;

when the predetermined data is filled to before the actual synchronization search window, duplicating the cell search synchronization data in the actual synchronization search window to before the filled predetermined data, and when the predetermined data is filled to after the actual synchronization search window, duplicating the cell search synchronization data in the actual synchronization search window to after the filled predetermined data.

5. The cell search method according to claim 4, wherein the predetermined data is 0 or random numbers.

6. The cell search method according to claim 1, wherein when the length of the actual synchronization search window is smaller than the length of the first synchronization search window, after the step of duplicating a part of data carried in the first regular timeslot and the down pilot timeslot of the second sub-frame to before the actual synchronization search window, or duplicating a part of data carried in the first regular timeslot and the down pilot timeslot of the first sub-frame to after the actual synchronization search window, the method further comprising:

further determining whether phase transition is present between cell search synchronization data and the actual synchronization search window; and when the phase transition is present, performing phase compensation on the duplicated cell search synchronization data;

wherein, the cell search synchronization data comprises the data carried in the first regular timeslot and the down pilot timeslot.

7. A cell search device, applied to wireless communication system to perform cell search synchronization, frame signals of the wireless communication comprising a first sub-frame and a second sub-frame, both of the first sub-frame and the second sub-frame comprising a first regular timeslot and a down pilot timeslot; the cell search device comprising:

a determination module and a control module;

wherein, the determination module determines whether a length of an actual synchronization search window is smaller than a length of a first synchronization search window, the length of the first synchronization search window is a sum of a length of the first sub-frame and a length of the first regular timeslot and the down pilot timeslot of the second sub-frame; the determination module further sends a determination result to the control module; and the control module receives the determination module; when the length of the actual synchronization search window is smaller than the length of the first synchronization search window, the control module duplicates a part of data carried in the first regular timeslot and the down pilot timeslot of the second sub-frame to before the actual synchronization search window, or duplicates a part of data carried in the first regular timeslot and the down pilot timeslot of the first sub-frame to after the actual synchronization search window, such that a sum of a length of the duplicated data and the length of the actual synchronization search window is not smaller than the length of the first synchronization search window.

8. The cell search device according to claim 7, wherein the length of the first synchronization search window is at least 5.75 ms.

9. The cell search device according to claim 7, wherein:

when the length of the actual synchronization search window is smaller than the length of the first synchronization search window, the determination module further determines whether the length of the actual synchronization search window is smaller than the length of the first sub-frame;

when the length of the actual synchronization search window is not smaller than the length of the first sub-frame, the control module further duplicates cell search synchronization data in the second sub-frame that is the first 5 ms of the actual synchronization search window to before the actual synchronization search window, or duplicates cell search synchronization data in the first sub-frame that is the last 5 ms of the actual synchronization search window to after the actual synchronization search window, such that a sum of the length of the duplicated data and the length of the actual synchronization search window is not smaller than the length of the first synchronization search window; and the cell search synchronization data in the second sub-frame comprises the data carried in the first regular timeslot and the down pilot timeslot of the second sub-frame, and the cell search synchronization data in the first sub-frame comprises the data carried in the regular timeslot and the down pilot timeslot of the first sub-frame.

10. The cell search device according to claim 9, wherein:

when the length of the actual synchronization search window is smaller than the length of the first synchronization search window, the control module further fills predetermined data to before the actual synchronization search window, or fills the predetermined data to after the actual synchronization search window, such that a sum of a length of the filled predetermined data and the length of the actual synchronization search window is equal to the length of the first synchronization search window;

when the predetermined data is filled to before the actual synchronization search window, the control module duplicates the cell search synchronization data of the actual synchronization search window to before the filled predetermined data, such that a sum of the length of the duplicated data, the length of the filled predetermined data and the length of the actual synchronization search data is not smaller than the length of the first synchronization search window; and when the predetermined data is filled to after the actual synchronization search window, the control module duplicates the cell search synchronization data of the actual synchronization search window to after the filled predetermined data, such that the sum of the length of the duplicated data, the length of the filled predetermined data and the length of the actual synchronization search data is not smaller than the length of the first synchronization search window.

11. The cell search device according to claim 10, wherein the predetermined data is 0 or random numbers.

12. The cell search device according to claim 7, wherein:

the determination module further determines whether phase transition is present between cell search synchronization data and the actual synchronization search window;

when the phase transition is present, the control module further performs phase compensation on the duplicated cell search synchronization data; and the cell search synchronization data comprises the data carried in the first regular timeslot and the down pilot timeslot.

* * * * *